United States Patent [19]
Haka et al.

[11] Patent Number: 5,535,865
[45] Date of Patent: Jul. 16, 1996

[54] TORQUE TRANSMITTING FRICTION DEVICE AND CONTROL

[75] Inventors: Raymond J. Haka, Brighton; Dean E. Mc Culloch, Rochester Hills; Leo G. Steinl, Birmingham, all of Mich.

[73] Assignee: General Motors Corporation, Detroit, Mich.

[21] Appl. No.: 294,168

[22] Filed: Aug. 22, 1994

[51] Int. Cl.⁶ .................... F16D 43/286; F16D 25/0638
[52] U.S. Cl. ................................. 192/54.3; 192/85 AA; 192/109 F
[58] Field of Search .................. 192/85 R, 85 AA, 192/109 F, 54.3; 475/125, 126

[56] References Cited

U.S. PATENT DOCUMENTS

| | | | |
|---|---|---|---|
| 4,261,213 | 4/1981 | Rattunde | 192/54 X |
| 4,805,752 | 2/1989 | Malloy et al. | 192/85 AA |
| 4,969,546 | 11/1990 | Haka | 192/85 AA |
| 5,031,746 | 7/1991 | Koivunen | 192/85 AA |
| 5,106,348 | 4/1992 | Koivunen | 475/126 |
| 5,281,190 | 1/1994 | Koivunen | 192/85 AA |

*Primary Examiner*—Richard M. Lorence
*Attorney, Agent, or Firm*—Donald F. Scherer

[57] ABSTRACT

A multi-speed power transmission has a fluid operated torque transmitting device, such as a clutch, which is selectively engaged during two forward ranges. A hydraulic control is provided to enforce operation of the clutch in a manner consistent with a one-way shifting device.

4 Claims, 6 Drawing Sheets

TORQUE TRANSMITTING FRICTION DEVICE AND CONTROL

TECHNICAL FIELD

This invention relates to shift controls for friction devices in multi-speed power transmissions, and more particularly, for shift controls providing pressure for a controlled torque capacity at a clutch during torque reversal.

BACKGROUND OF THE INVENTION

Automatic transmissions utilize one or more mechanically actuated one-way clutches, such as sprags or roller clutches, to eliminate potential interference during a shift interchange. The one-way clutches function similar to a very stiff spring in the forward direction and provide a step change in the effective spring rate which changes abruptly to a zero spring rate with a small amount of drag torque when the direction of torque transmission is reversed. These one-way clutches do not exhibit any perceptible delay in the apply or release conditions.

Hydraulic one-way clutches have been proposed for a number of years. There are a variety of ways of executing a hydraulic one-way clutch, but the most common is to use rotational lash valves to switch piston apply pressure on or off, depending upon the relative direction of torque. These devices have an advantage over the mechanical one-way clutch in that the apply pressure can be modulated to dissipate energy on apply or release and can provide two-way torque transmission when desired.

The prior art transmissions utilizing one-way clutches frequently place a conventional friction device in series with the one-way device to provide for engine braking during coast operation.

The most obvious disadvantage of existing one-way clutches is the potential delay for apply or release after or when the torque direction is reversed. The mechanical one-way devices only experience the delay of changing from a very stiff spring rate to a zero spring rate which is very slight. The hydraulic one-way clutches need time to flow oil in or out of the clutch chamber which has a potential to noticeably change the quality of the shift in an automatic automotive transmission.

It has been found with hydraulic one-way clutches that the shift delay is most noticeable during a downshift; that is, a shift interchange from a high ratio to a low ratio. Prior art patents which disclose hydraulic one-way clutches are U.S. Pat. No. 4,805,752 issued to John D. Malloy on Feb. 21, 1989, or U.S. Pat. No. 4,969,546 issued to Raymond J. Haka on Nov. 13, 1990.

SUMMARY OF THE INVENTION

The present invention proposes a hydraulically operated friction device and control system which will permit the friction device to simulate a one-way clutch operation.

The hydraulic control unit is effective to feed a tickle or light pressure through a series of check balls just prior to initiating a downshift. This pressure will minimize the apply delay by keeping the clutch piston stroked and ready to receive the higher pressure when the torque reverses. With the control ability to turn the tickle pressure off, it will still provide a one-way clutch that has no torque capacity beyond the drag of an opened friction clutch.

It is an object of this invention to provide an improved torque transmitting friction device and control valve, wherein the valving switches pressure sources at the friction device when a change in direction of torque transmission occurs at the friction device.

It is another object of this invention to provide an improved control, wherein a pressure control regulator valve will establish a low pressure fluid source to control the piston stroke of a torque transmitting friction device when the friction device is in the normally de-energized position.

It is a further object of this invention to provide an improved control system for a torque transmitting friction device, wherein control valves are operable to provide the highest system available to the operating piston of the friction device.

It is yet another object of this invention to provide an improved control for a fluid operated torque transmitting friction device, wherein a low regulating pressure or exhaust pressure is controlled by a solenoid valve.

It is still another object of this invention to provide a control and torque transmitting friction device which is effective to replace two one-way clutches and two hydraulic clutches with a single hydraulic fluid operated friction device.

These and other objects and advantage of the present invention will be more readily apparent from the following description and drawings.

DESCRIPTION OF THE EXEMPLARY EMBODIMENTS

Figure 1:
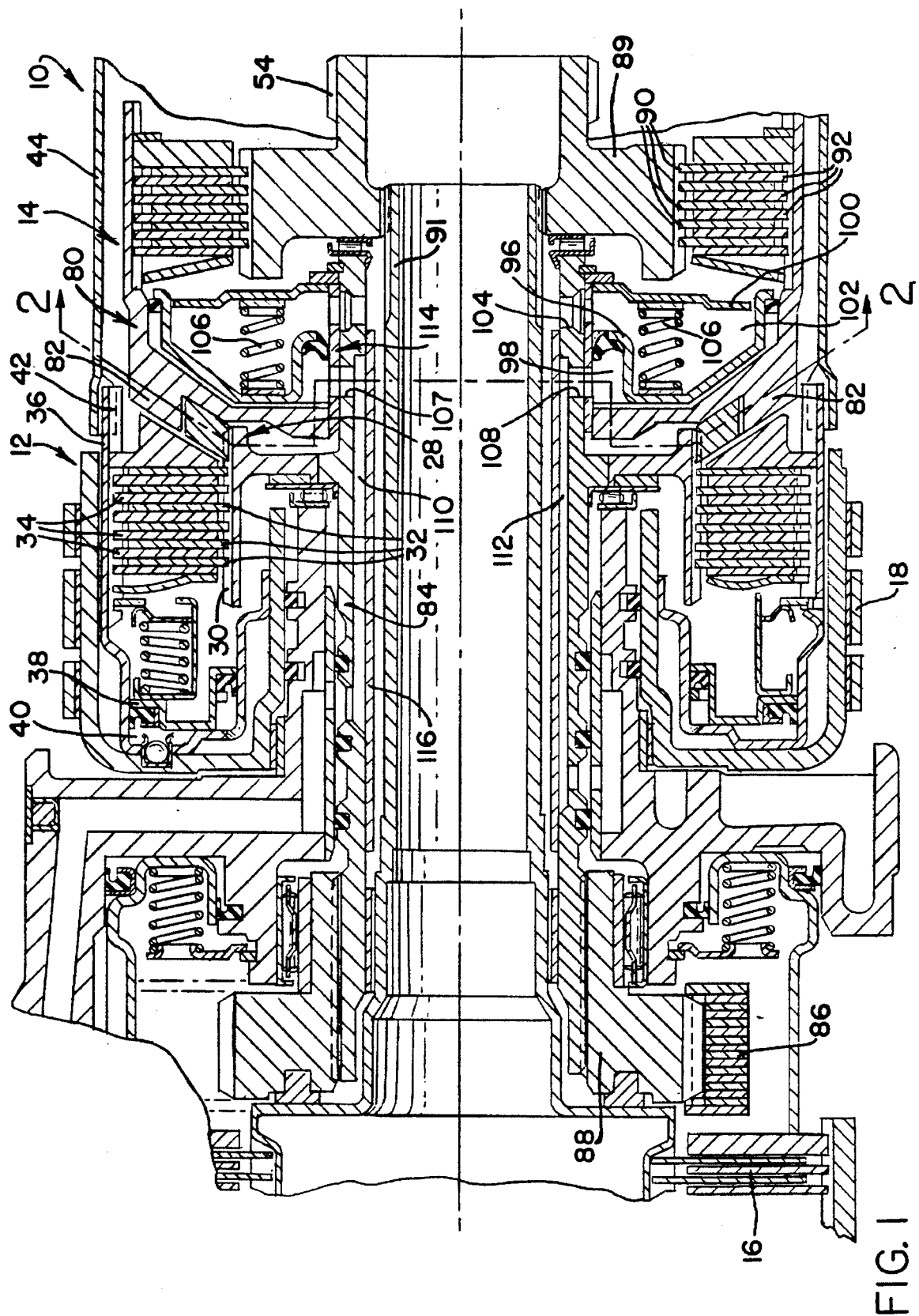
FIG. 1 is a cross-sectional elevational view of a portion of a multi-speed power transmission utilizing the present invention.

FIG. 1 depicts a portion of a power transmission 10 which includes two fluid operated clutch assemblies 12 and 14 and a fluid operated disc brake assembly 16 and a band brake assembly 18.

The clutch assembly 12 includes an input hub 28 which has a splined outer surface 30 to which is splined a plurality of friction plates 32. Alternating with the friction plates 32 is a plurality of friction plates 34 which are splined to a clutch housing 36.

A hydraulic piston 38 is slidably disposed in the housing 36 and is operable in response to fluid pressure in a chamber 40 to enforce frictional engagement between the plates 32 and 34. The housing 36 is connected at a spline interface 42 to a transfer sleeve 44 which in turn is connected to one or more members of a planetary gear arrangement, not shown, which may be constructed in accordance with those described in U.S. Pat. Nos. 5,069,656, issued to Sherman on Dec. 3, 1991; 4,237,749 issued to Koivunen on Dec. 9, 1980; 4,086,827 issued to Chana on May 2, 1978; 2,856,794 issued to Simpson on Oct. 21, 1958; or any other well known arrangements.

The clutch assembly 14 includes an input clutch housing 80 which is drivingly connected through tangs 82 to the input hub 28 and therefore to an input shaft 84. The input shaft 84 receives power from a conventional torque converter, not shown, through an input chain 86 and an input sprocket 88. This is a conventional input system for a power transmission.

The clutch assembly 14 also includes an output hub 89 and a plurality of interleaved friction plates 90 and 92 splined to the hub 89 and housing 80, respectively. The hub 89 is integrally formed or otherwise secured with sun gear 54, which is a component of the planetary arrangement. Whenever the clutch assembly 14 is fully engaged, the gear 54 will rotate at the speed of the input shaft. The hub 89 is connected with the brake 16 by a sleeve shaft 91, such that the gear 54 may be held stationary by brake 16.

The clutch assembly 14 further includes a hydraulically operated piston 96 which is controlled to selectively engage and disengage the clutch assembly 14 by fluid pressure in a chamber 98. The piston 96 cooperates with an annular wall 100 to form a control chamber 102 which is in continuous fluid communication with a lube passage 104. Fluid pressure in the lube passage 104 will assist a plurality of return springs 106 to disengage the clutch and prevent clutch drifting on engagement due to centrifugal pressures.

The chamber 98 has a first supply passage or port 107 and a second supply passage or port 108 which are in fluid communication with control passages 110 and 112, respectively. The fluid pressure available to the chamber 98 from the passages 110 and 112 is controlled by a sleeve valve 114 which is operable to rotate with the clutch housing 80. The drive tangs 82 are operable to permit relative angular excursion between the clutch housing 80 and the input hub 28. Thus, the sleeve valve 114 is rotated relative to the input shaft 84 so as to control the source of fluid pressure for the chamber 98.

Figure 2:
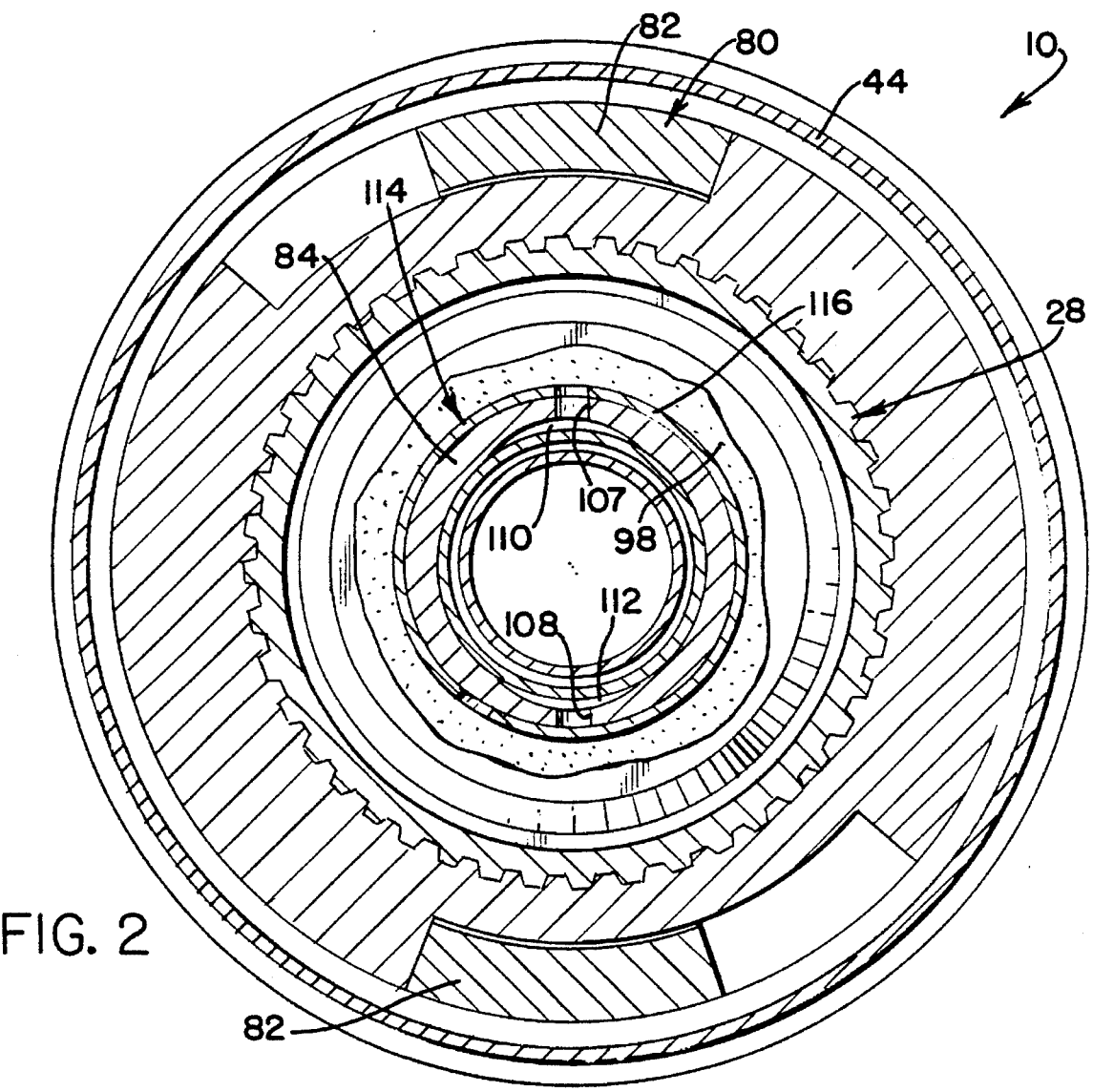
FIG. 2 is a view taken along line 2—2 of FIG. 1.

In the position shown in FIG. 2, the passage 110 is in fluid communication through passage 107 with the chamber 98, such that whatever fluid pressure is available in passage 110 would be available to energize the piston 96. If the clutch housing is rotated counterclockwise relative to the hub 28, the sleeve valve 114 will align to provide fluid communication between passage 108 and the chamber 98. Thus, in the adjusted position, the fluid pressure available in passage 112 is available to control the energization of the piston 96.

As best seen in FIG. 2, the passages 110 and 112 are lunate in cross section and have the outer surface thereof controlled by the input shaft 84 and the inner edge controlled by a sleeve seal 116. Thus, the two pressures or passages 110 and 112 will not intermix.

Briefly, when the clutch assembly 14 is to transmit torque in the forward direction, the pressure in passage 110 will be controlling and when a reverse or negative torque is placed on the clutch assembly 14, the fluid pressure in passage 112 will be controlling. The clutch 14 and associated valving structure will provide for the replacement of two fluid operated clutches and two one-way clutches in at least one commercially available transmission.

In the schematic representations of FIGS. 3A through 3G and FIG. 4, the sleeve valve 114 is represented by a block 114A and the passages 110 and 112 are given the same numerical designation as in FIG. 1.

Figure 3A:
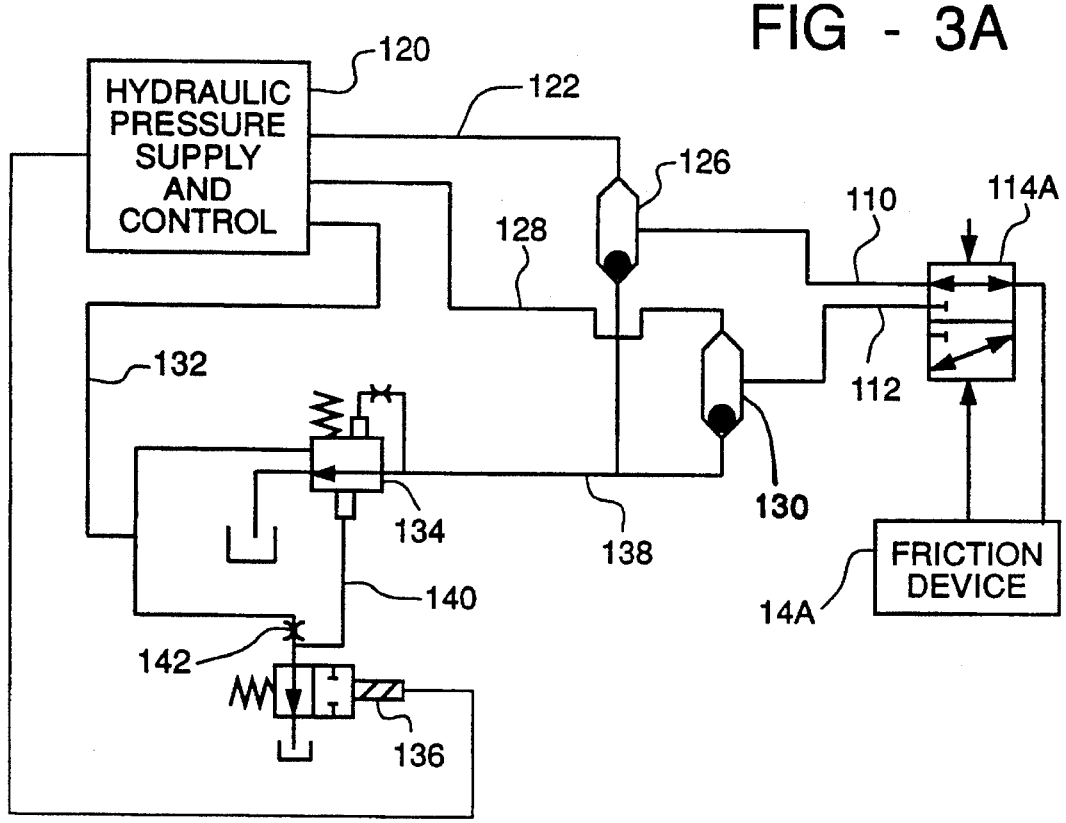
FIGS. 3A, 3B, 3C, 3D, 3E, 3F and 3G are schematic representations of a control for operating one of the friction devices shown in FIG. 1 during various operating conditions of the transmission.

Referring to FIG. 3A, there is seen a hydraulic pressure supply and control mechanism 120 which is a conventional device in automatic power transmissions. The control 120 will generally include a positive displacement high pressure pump, control valves for determining when shift interchanges or ratio interchanges are to be accomplished, electronic devices for controlling pressures within the system and a CPU or processing unit which takes the form of a programmed digital computer to establish the operating sequences of the transmission. These devices are well known and it is believed that those skilled in the art will not need further description at this point.

The sleeve valve 114A is disposed in fluid communication with a friction device 14A, such that fluid pressure from passages 110 and 112 is controlled for distribution to enforce the engagement control of the friction device of 14A. The hydraulic control 120 supplies pressure through a passage 122 to a ball check or shuttle valve 126 and through a passage 128 to a ball check or shuttle valve 130.

The pressure in passages 122 and 128 is determined in accordance with the desired operating sequence of the transmission by the control 120. In other words, the pressure in passage 122 and 128 can be either high pressure or low pressure depending upon the condition to be established within the transmission.

The hydraulic control 120 also supplies line pressure, which is the highest pressure in the system, to a passage 132 from which it is distributed to a control valve 134 and a solenoid valve 136. The solenoid valve 136 is a conventional on/off solenoid and the control valve 134 is a conventional downstream pressure regulator valve. Such valves 134 are known to be used to control the pressure downstream of the valve independently of the incoming or line pressure in this instance. The downstream passage 138 of the control valve 134 is in fluid communication with both ball check valves 126 and 130.

The control valve 134 also has a control pressure from a passage 140 which is established by the solenoid valve 136. The pressure in passage 140 is supplied through a restriction or orifice 142 from the line pressure in passage 132. When the solenoid valve 136 is off, as shown in FIG. 3A, the passage 140 is exhausted through the solenoid valve 136 and therefore the control pressure at valve 134 is zero resulting in substantially zero pressure in passage 138.

Figure 3B:
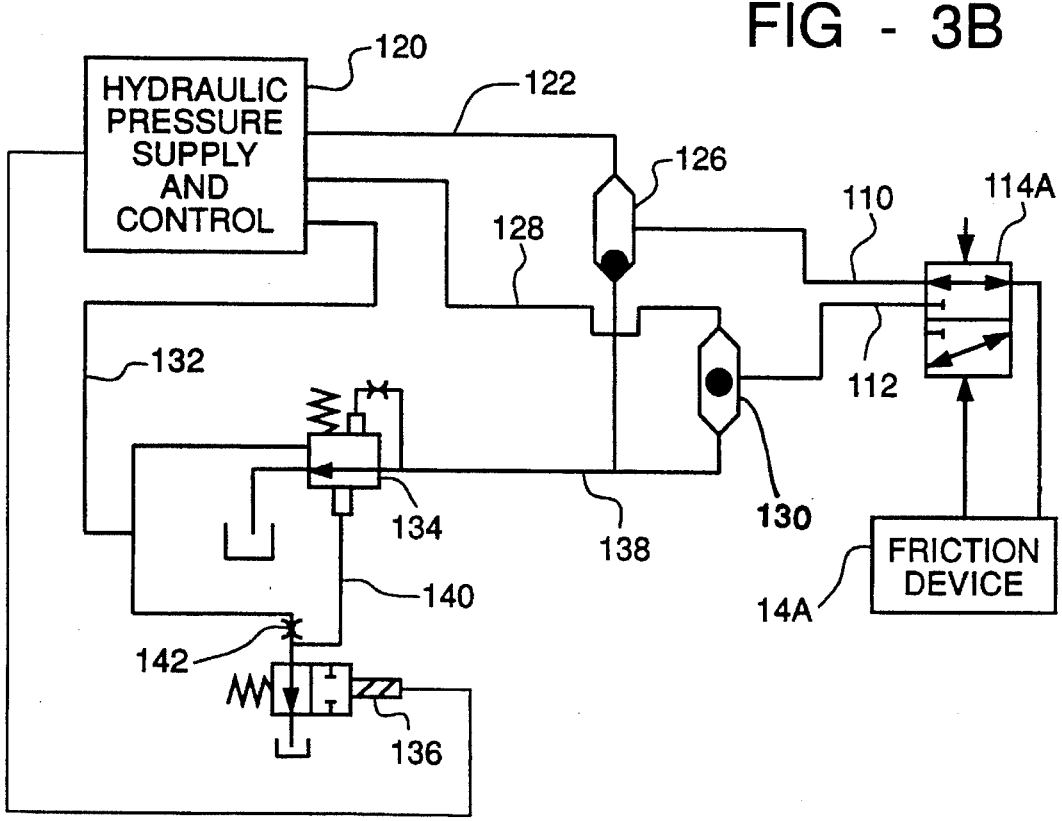
Figure 3C:
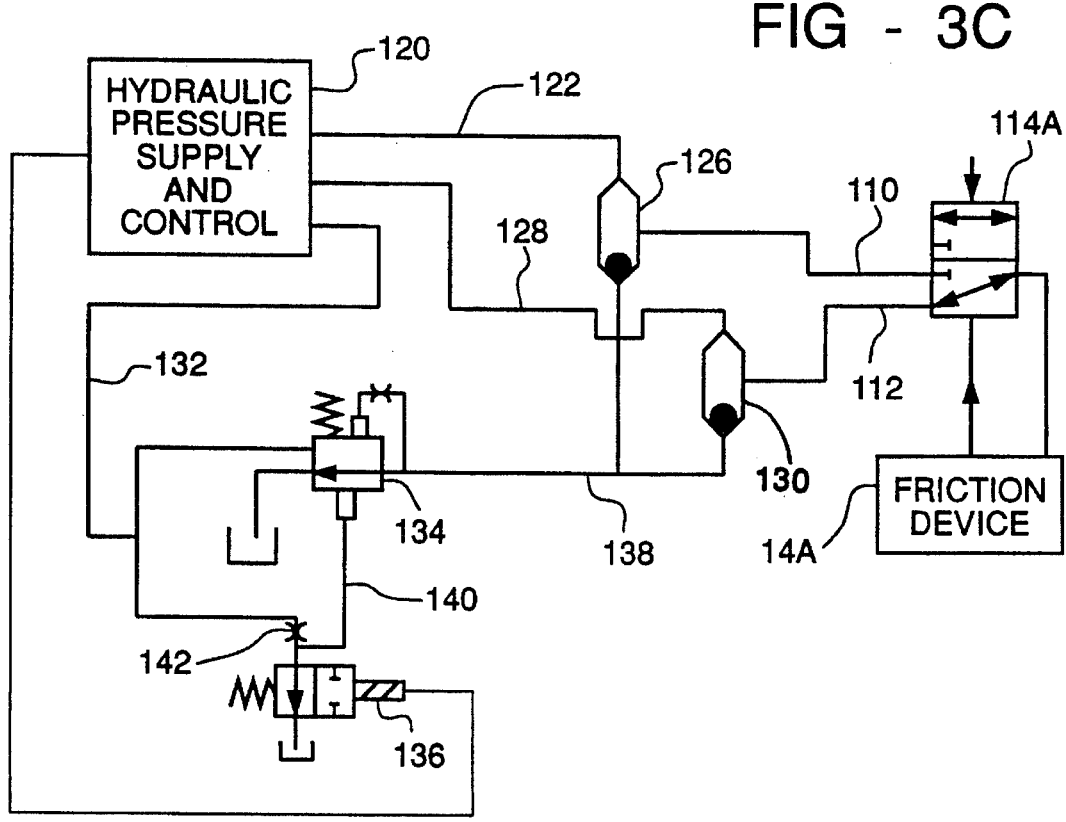
Figure 3D:
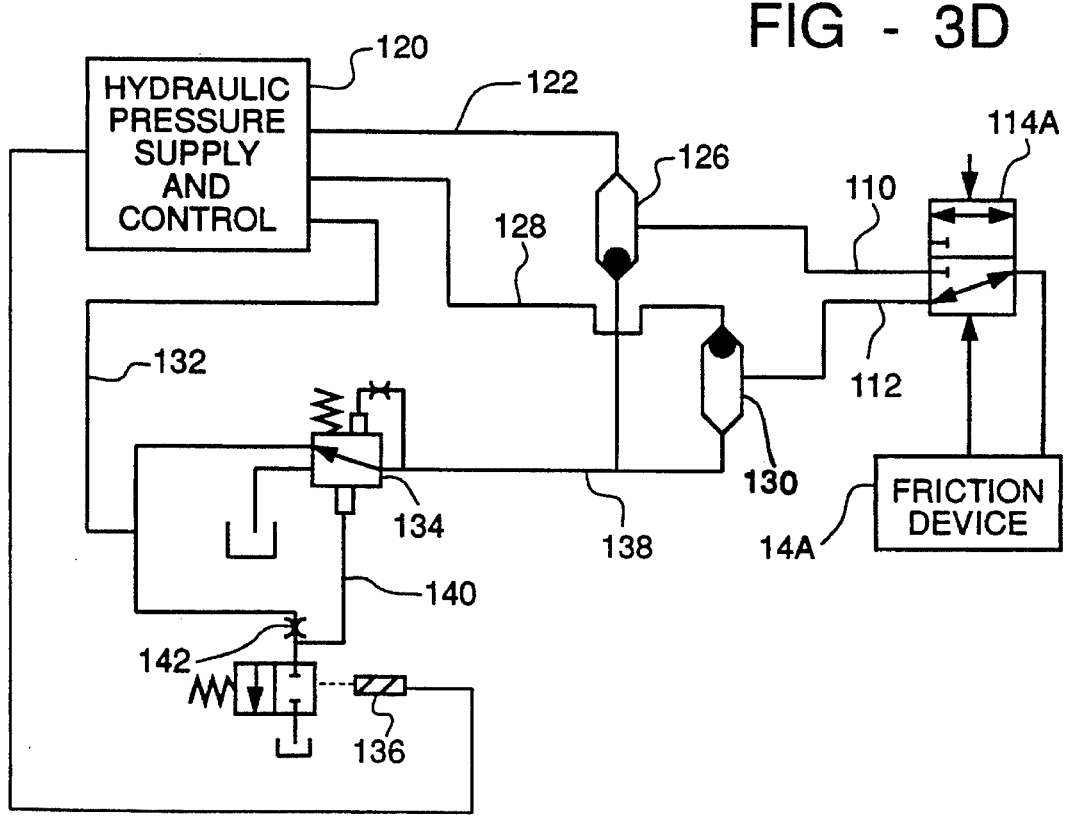
Figure 3E:
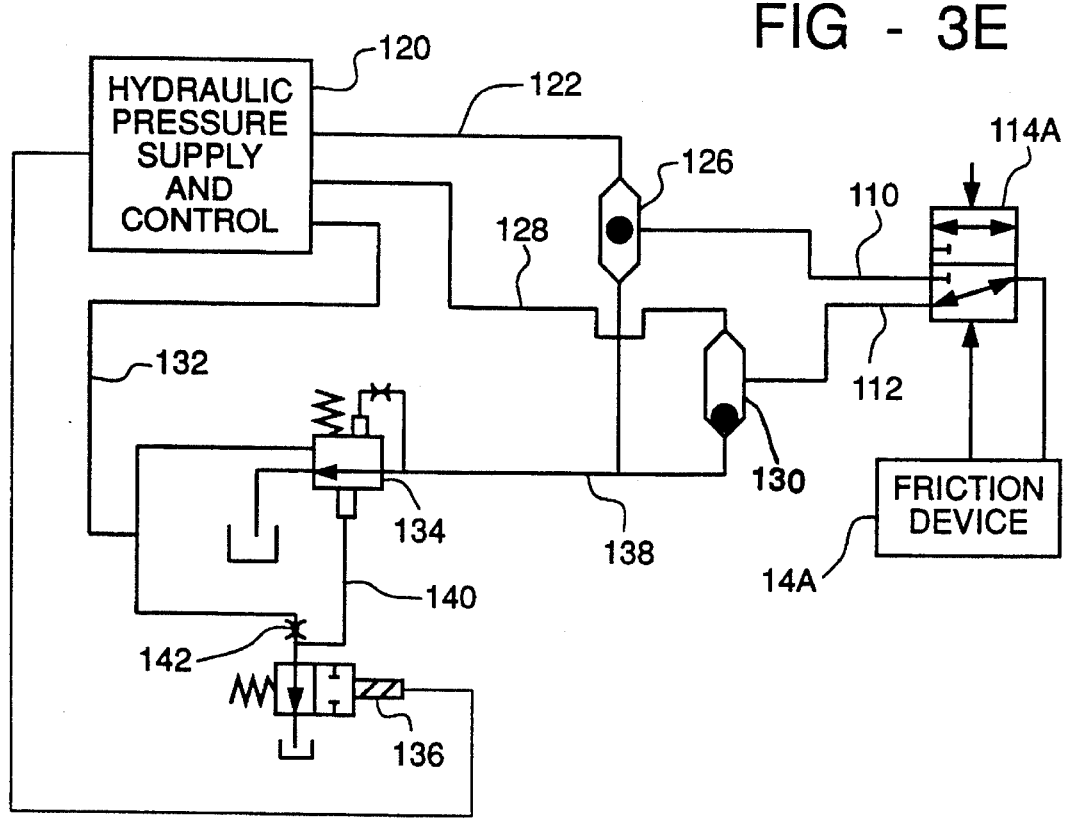
Figure 3F:
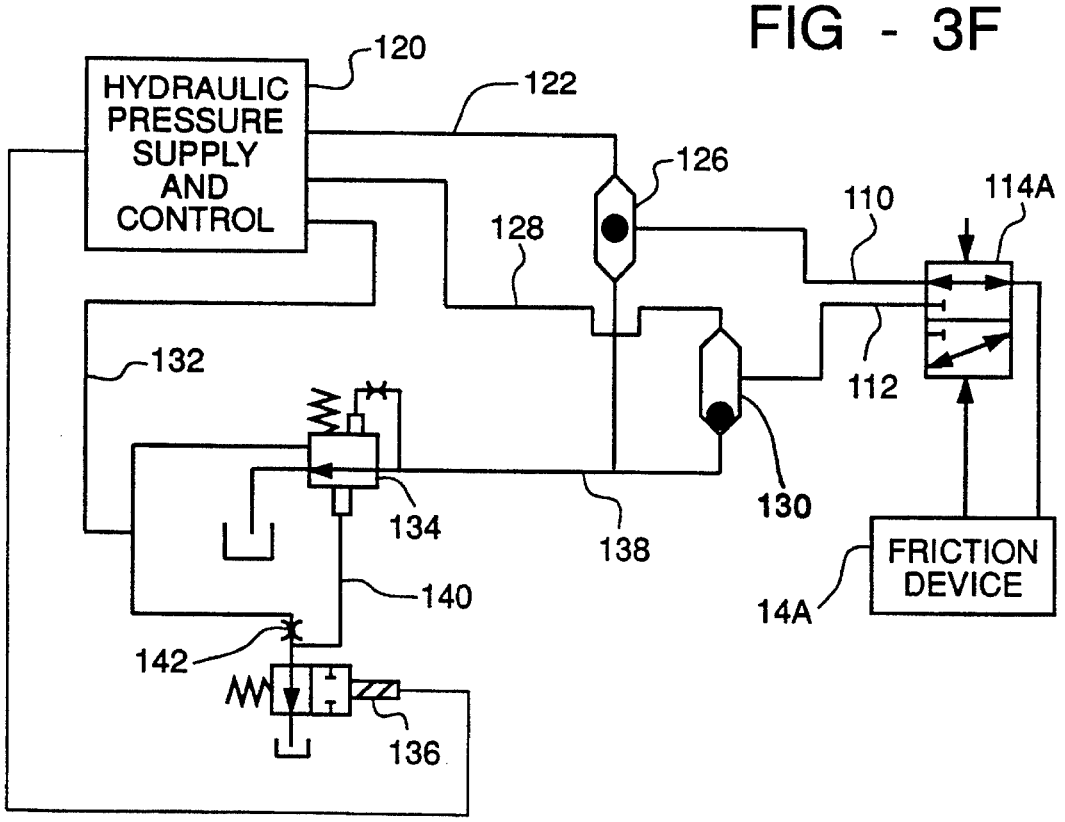
Figure 3G:
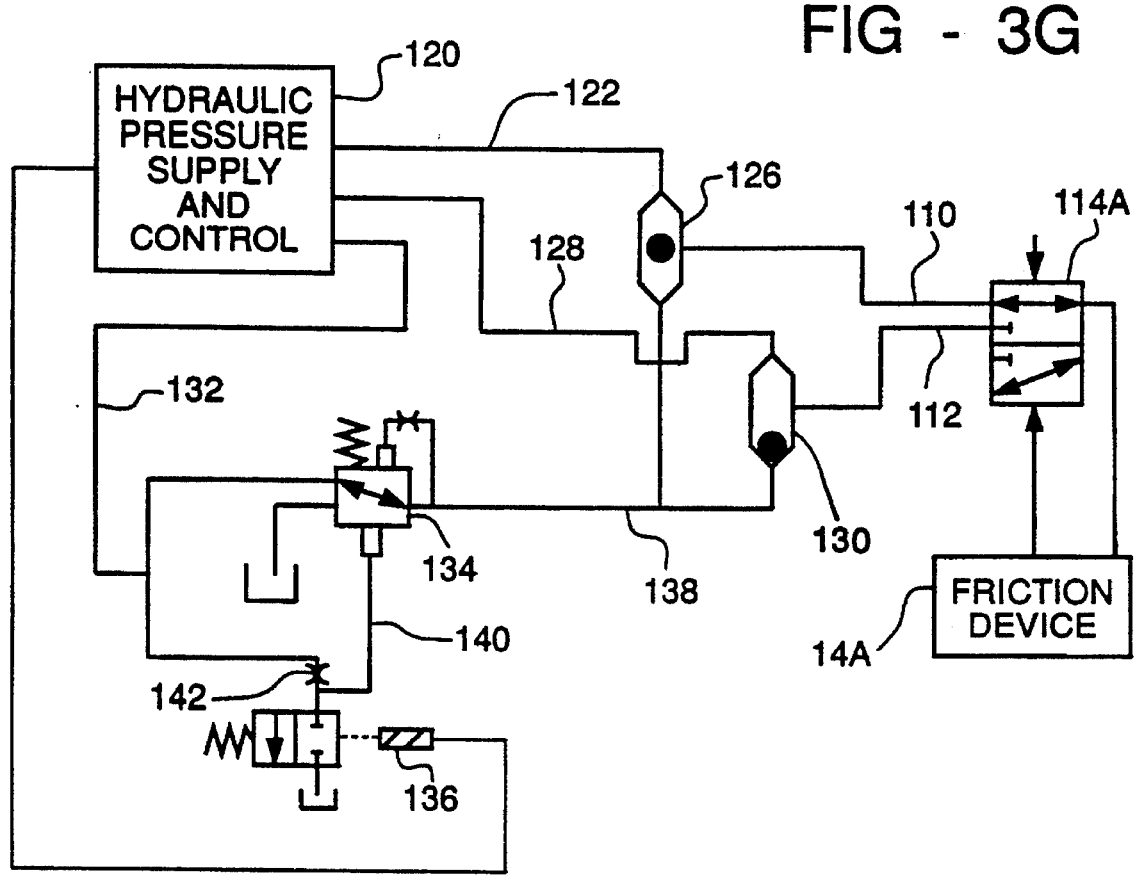

In FIGS. 3D and 3G, the solenoid valve 136 is energized, such that the passage 140 is blocked from exhaust and a high pressure fluid in passage 132 will be directed to the control valve 134 resulting in a controlled pressure being available in passage 138. For the purposes of this disclosure, the pressure in passage 138 will be denoted as a tickle pressure. The tickle pressure in passage 138 is designed to be sufficient to fill the chamber 98 of clutch assembly 14 with sufficient pressure, such that the piston 96 will be brought into pre-engagement with the friction plates 90 and 92. In this condition, the return springs 106 will be slightly compressed and the friction plates 90 and 92 will be positioned to begin frictional torque transmission.

The fluid pressure in passages 122 and 128 in FIG. 3A is at an elevated level. The level of pressure is sufficient to provide full engagement of the clutch assembly 14. Thus, the clutch 14 is engaged independent of the direction of torque transmission. This is the condition which the pressure control 120 whenever the operator has selected manual first or manual third operation. During either of these operations, the operator has requested that engine braking be available, thus the clutch assembly 14 is to be engaged whether there is a positive engine transmitting torque or a negative vehicle transmitting torque being imposed thereon.

When the transmission is operating in the normal first gear operation, reverse, park or neutral, the passage 122 has high pressure imposed thereon and the passage 128 is exhausted and the solenoid 136 is off, as shown in FIG. 3B. Under this condition, as long as the clutch 14 is transmitting forward torque, that is, the engine is driving the vehicle, the clutch will be fully engaged. However, when the operator releases the throttle and the vehicle goes into a coast condition, the sleeve valve 114A will be operated on by the torque forces to cause the exhausting of the clutch chamber 98 thereby releasing the clutch 14, such that the vehicle coasting will freewheel.

The schematic shown in FIG. 3C is the condition during second gear forward operation and during a 1–2 upshift. During this condition, the passage 122 is pressurized with high pressure while the remaining control passages are exhausted.

During a 1–2 upshift, it is desirable to engage the clutch assembly 12 and to relieve the torque transmitting capability of the clutch assembly 14. This is accomplished by the sleeve valve 114 as shown in FIG. 3C. As seen there, the sleeve valve 114A is moved, such that the passage 112 is connected to the chamber 98. The passage 112 communicates the higher of fluid pressure in passage 128 and 138 to the clutch chamber 98. However, both of these fluid pressures are zero or exhaust, and therefore torque transmission is relieved at the clutch assembly 14 when the clutch assembly 12 has sufficient torque capacity to enforce a torque reversal at the sun gear 54. During both first and second gear operation, the band brake 20 is engaged to establish the sun gear 62 as a reaction member within the transmission.

The schematic representation of FIG. 3D describes a 2–1 interchange or downshift. During this maneuver, the fluid pressure in passage 122 is high pressure, the fluid pressure in passage 128 is exhaust or low pressure, and the fluid pressure in passage 138 is the tickle pressure. To prepare the clutch 14A for the downshift, the tickle pressure positions the piston 96 to the pre-engagement position described above, and establishes a slight drag torque in the system.

When the clutch 12 is released to institute the 2–1 downshift, the drag torque at clutch assembly 14 will cause a torque reversal as the sun gear 54 attempts to pick up the drive torque, such that the valve 114 will assume the position shown in FIG. 3B and first gear will be achieved within the transmission.

The schematic representation in FIG. 3E is that which is achieved during third gear or during a 2–3 upshift or 3–2 downshift. In this condition, the passage 122 and 138 are both exhaust pressure and the passage 128 is high pressure. Thus, the chamber 98 is fed fluid pressure via passage 112 and that passage is high pressure.

During the third gear operation, the planetary gear arrangement is such that the sun gear 54 is attempting to transmit torque back to the engine or is undergoing a regeneration process. Because of the direction of torque, the valve 114 will assume the position shown in FIG. 3E, such that fluid pressure in passage 112 enforces engagement of the clutch 14. With both clutch 14 and clutch 12 engaged, the transmission is conditioned for third gear operation.

The schematic representation in FIG. 3F is the fourth gear operation or the 3–4 upshift operation. During this operation, the pressures in passages 122, 128 and 138 are the same as for the third gear portion of FIG. 3E. In fourth gear, the brake 16 is engaged which causes the sun gear 54 to have a forward reaction. This causes the valve 114 to assume the position shown in FIG. 3F which connects the chamber 98 to the passage 110. The passage 110 is connected through the shuttle valve 126 through passages 122 and 138, both of which are controlled at the exhaust level and therefore the clutch 14 is disengaged.

During a 4–3 downshift, it is necessary to apply the tickle pressure to the chamber 98 via the passage 110. This is accomplished through the shuttle valve 126. Thus, in preparation for a 4–3 downshift, the solenoid 136 is energized resulting in an increase in passage 138. This pressure in passage 138, as previously described, establishes a pre-engagement condition in the clutch 14. This pressure is distributed through shuttle valve 126 and passage 110 to the chamber 98, such that when the brake 16 is disengaged on the 4–3 downshift, the drag pressure instituted at the clutch assembly 14 will cause a torque reversal resulting in high pressure being supplied via passage 128 when the valve 114 assumes the position shown in FIG. 3E which is the third gear operating position.

It should be apparent from the above description that the utilization of the two check valves and the controlled tickle pressure permit the clutch 14 to be either fully engaged for both directions of torque transmission or engaged as torque transmission in only one direction with the other direction of torque transmission being operated on with a tickle pressure at the clutch assembly.

Figure 4:
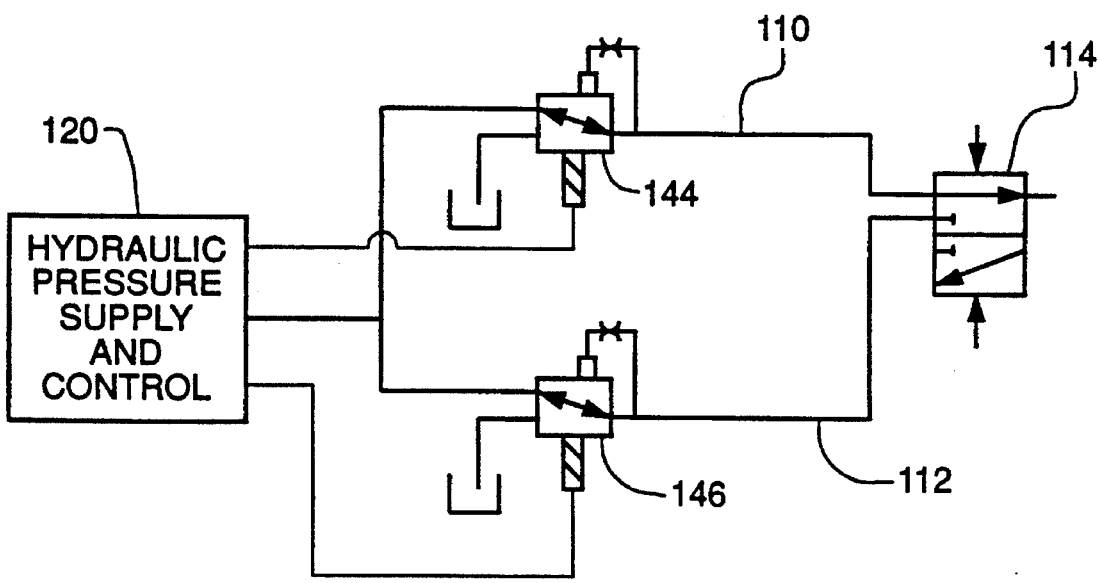
FIG. 4 is a schematic representation of an alternative embodiment of the control mechanism for the present invention.

The schematic representation shown in FIG. 4 is a control mechanism which permits direct pressure control at the clutch 14. With the control system shown in FIG. 4, the passages 110 and 112 are pressurized by pulse width modulated (PWM) solenoid valves 144 and 146, respectively.

As is well known with pulse width modulated type solenoid valves, the pressure output of these valves can be controlled between exhaust level and line pressure by the duty cycle imposed on the solenoid. This duty cycle is provided by the CPU which is available in the control 120. With the direct pressure control, it should be obvious that the pressure in passages 110 and 112 can be controlled at the desired levels to provide the same functions as described above for FIGS. 3A through 3G. That is, the clutch assembly 14 can be controlled to transmit full torque in both directions of operation as with FIG. 3A, to provide one-way operation with a tickle torque as described in FIGS. 3D and 3G.

To provide the function shown in FIG. 3D, the PWM solenoid 146 maintains a tickle pressure in passage 112 and the solenoid 144 maintains high pressure in passage 110. To provide the function shown in FIG. 3G, the pulse width modulated solenoid 144 establishes a tickle pressure in passage 110, and the PWM solenoid 146 establishes full pressure in passage 112.

From the foregoing, it should be apparent that the control system and friction device are operable to provide a hydraulic one-way clutch which is capable of operating in either direction of torque transmission as a one-way torque transmitter, while the opposite direction provides full torque transmission and is capable of being fully exhausted whenever it is desired to transmit no torque through the clutch.

The embodiments of the invention in which an exclusive property or privilege is claimed are defined as follows:

1. A fluid actuated friction torque transmitting device and control comprising:

shaft means;

means including said shaft means for transmitting torque from said fluid actuated friction torque transmitting device to a vehicle and to said fluid actuated friction torque transmitting device from the vehicle;

flow control valve means disposed for rotation with the shaft means and including lost motion means for permitting limited relative movement between the shaft means and the flow control valve means;

said control comprising, first control valve means for selectively directing a fluid controlled at a high pressure level to said flow control valve means when the torque transmitting means is transmitting torque from said fluid actuated friction torque transmitting device, a second control valve means for selectively directing a fluid controlled at a pressure level lower than said high pressure level to said flow control valve means when the torque transmitting means is transmitting torque to said fluid actuated friction torque transmitting device.

2. A fluid actuated friction torque transmitting device and control comprising:

shaft means;

fluid actuated piston means for engaging the fluid actuated friction torque transmitting device;

means including said shaft means for transmitting torque from said fluid actuated friction torque transmitting device to a vehicle and to said fluid actuated friction torque transmitting device from the vehicle;

directional flow control valve means having two input ports being disposed for rotation with the shaft means and including lost motion means for permitting limited relative movement between the shaft means and the flow control valve means for selectively controlling fluid communication between said input ports and said fluid actuated piston means;

said control comprising, first shuttle valve means for selectively directing a fluid controlled at a first pressure level to said flow control valve means when the torque transmitting means is transmitting torque from said fluid actuated friction torque transmitting device, a second shuttle valve means for selectively directing a fluid controlled at a second pressure level to said flow control valve means when the torque transmitting means is transmitting torque to said fluid actuated friction torque transmitting device.

3. The fluid actuated friction torque transmitting device and control defined in claim 2, wherein each shuttle valve means is effective to distribute a higher of the two pressure levels imposed thereon to respective input ports of said directional flow control valve means.

4. The fluid actuated friction torque transmitting device and control defined in claim 3, wherein a pressure control valve means is effective to selectively distribute a control pressure to both said shuttle valve means.

* * * * *